Sept. 2, 1969　　　V. H. HAASE ETAL　　　3,464,737
ROAD GROOVING APPARATUS

Filed Sept. 11, 1967　　　　　　　　　　　　4 Sheets-Sheet 1

INVENTORS.
VICTOR H. HAASE and
BY　JOHN R. HARCLERODE

*Fishburn, Gold & Litman*
ATTORNEYS

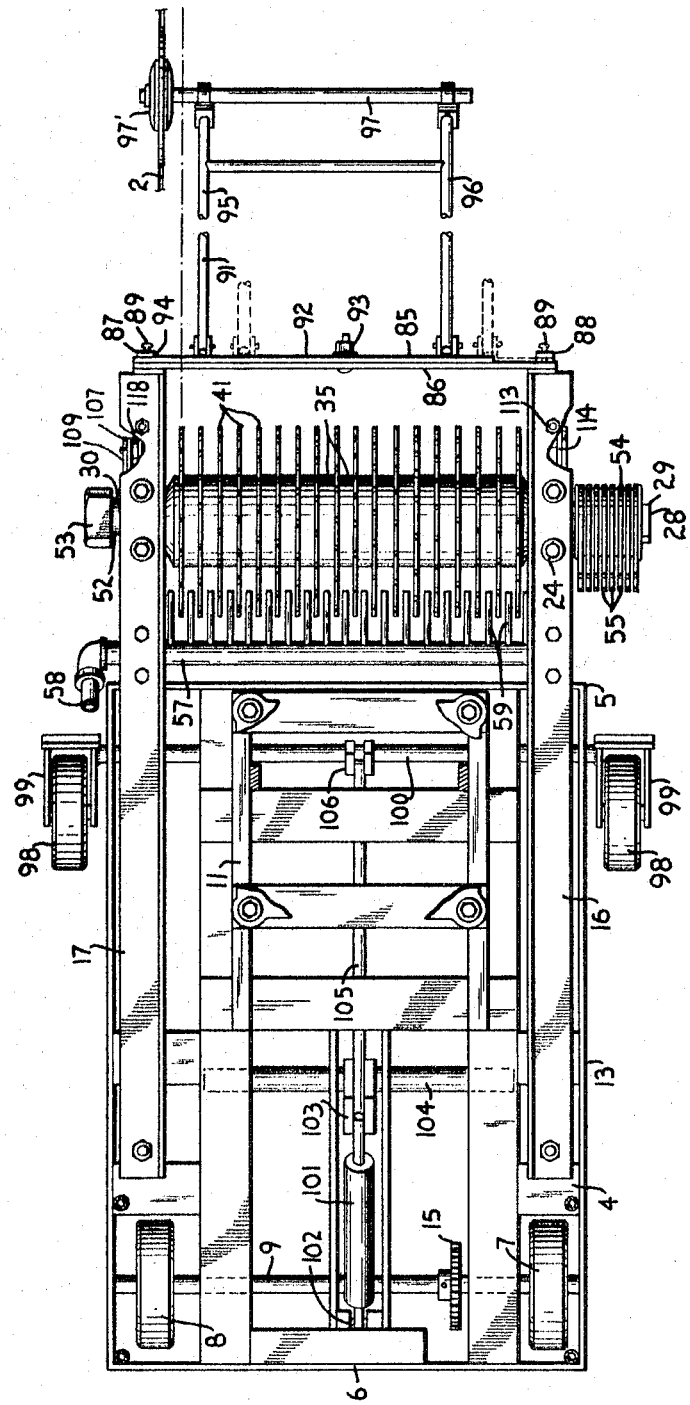

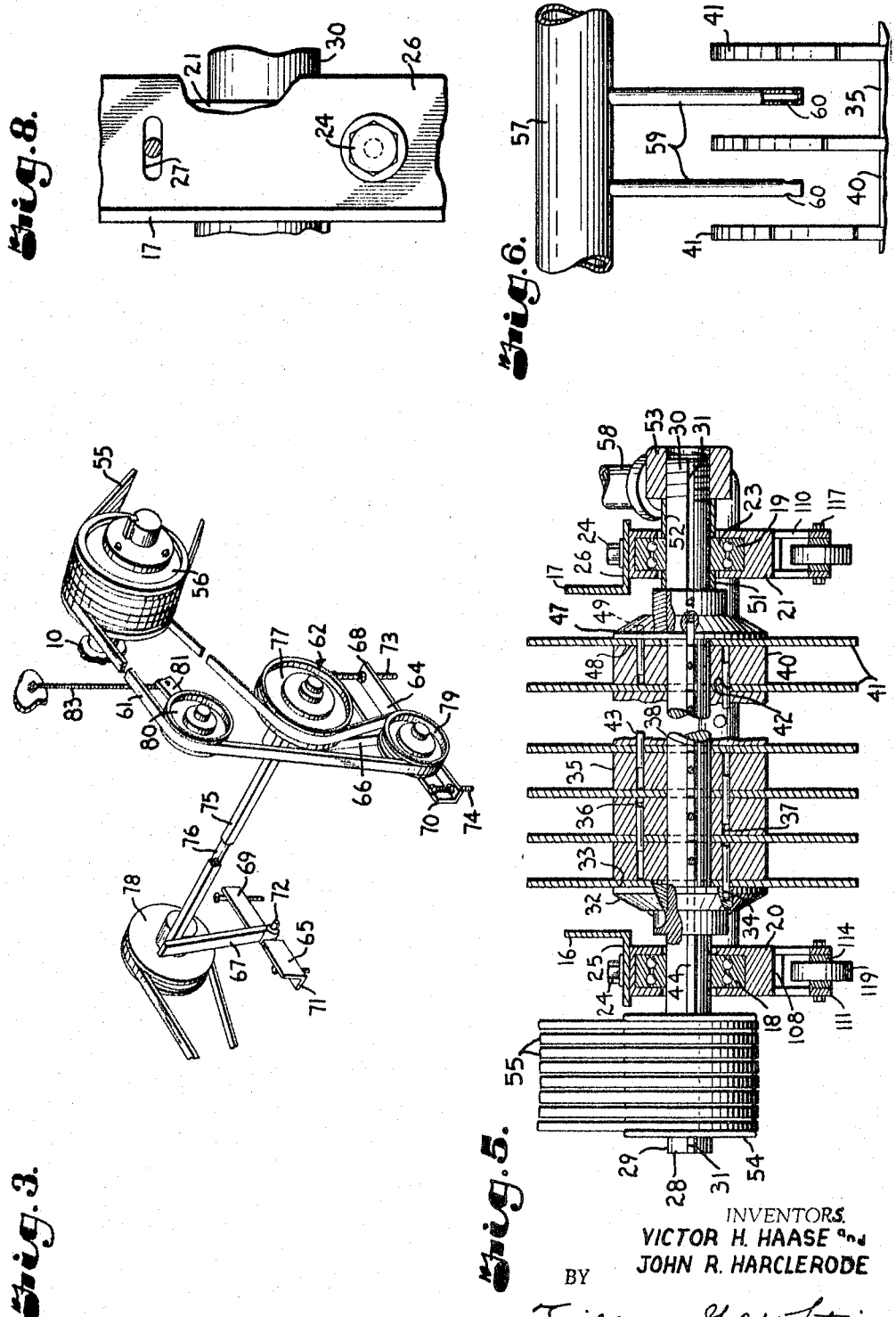

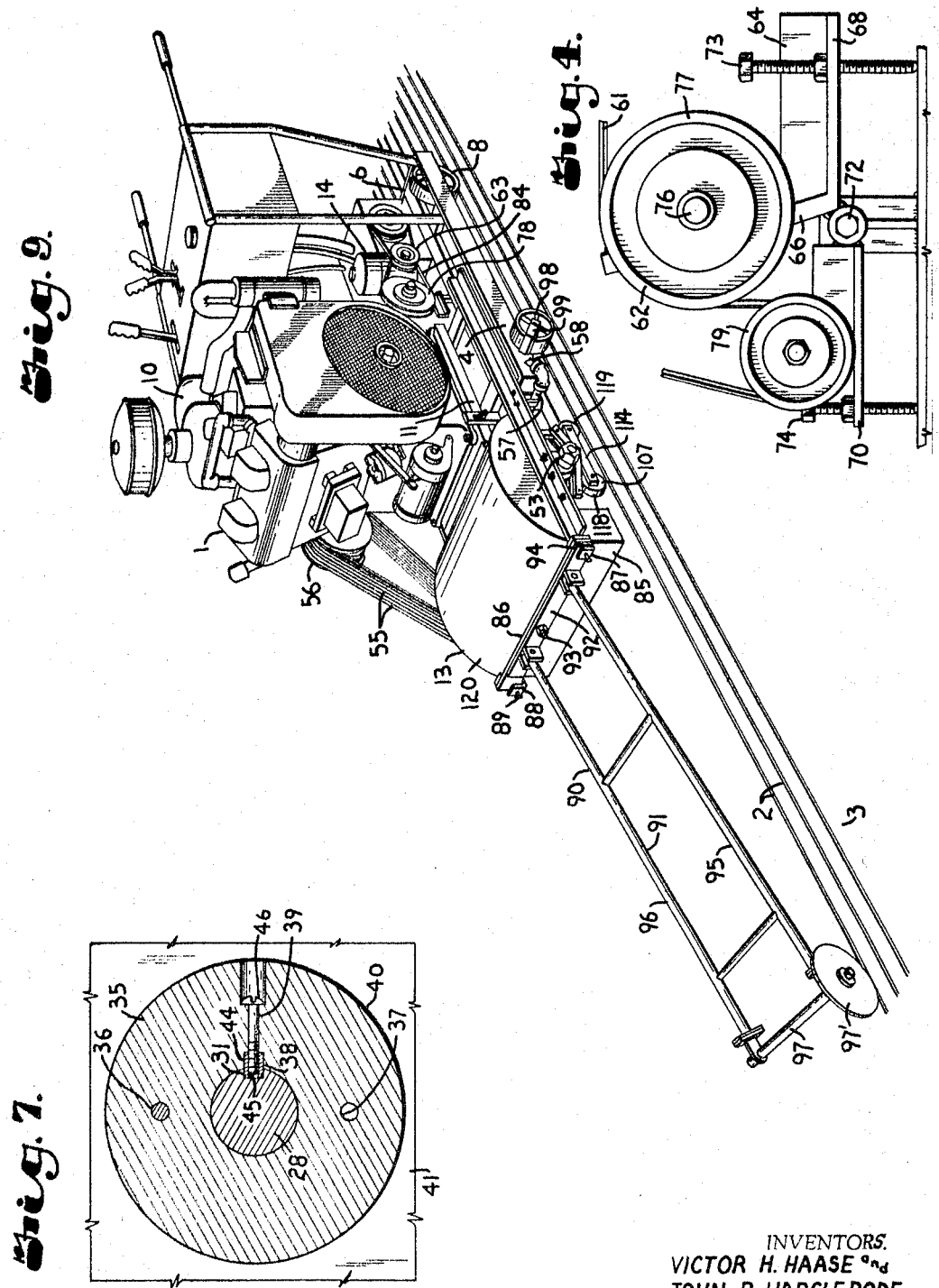

ered scale showing a direction-reversing portion of the power transmission train of FIG. 3.

FIG. 5 is a cross-sectional fragmentary view on an enlarged scale, through the blade holding structure.

FIG. 6 is a fragmentary plan view on an enlarged scale showing blade cooling members.

FIG. 7 is a fragmentary transverse cross-sectional view on an enlarged scale, through the blade holding structure of FIG. 5.

FIG. 8 is a fragmentary detail view on an enlarged scale, with parts broken away, showing an adjustable bearing support structure for the blade holder.

FIG. 9 is a perspective view on a reduced scale showing the apparatus in multiple groove cutting operation.

Figure 1:
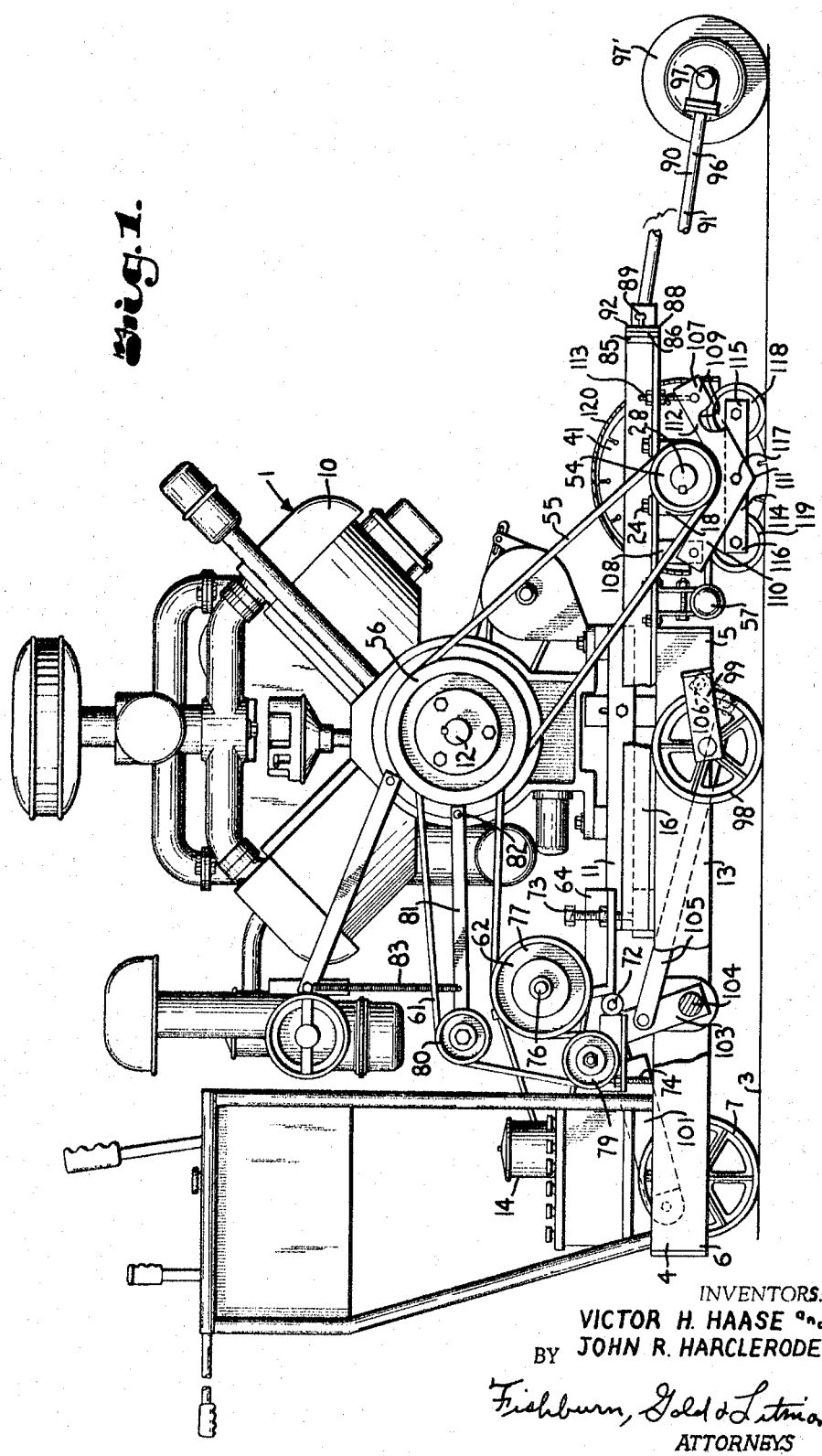

Referring to the drawings in more detail:

The reference numeral 1 generally indicates apparatus embodying this invention for simultaneously cutting multiple shallow grooves 2 in uniformly spaced-apart relation and depth in the surface 3 of pavement or the like. By way of example, such grooves may be three-eighths to one inch apart and one-eighth to one-quarter inch deep for the purpose of increasing wheel traction on aircraft runways or on dangerous stretches of highway. The grooves may be cut in groups of eighteen at a speed of about five feet per minute in hard concrete.

The apparatus 1 comprises a basic frame 4 which, in this example, is the frame used on the Series 6000 concrete/asphalt saws manufactured by the Robert G. Evans Company, Kansas City, Mo. The frame 4 has a forward end 5, a rear end 6 and rear supporting wheels 7 and 8 rotatably mounted on the frame near the rear end 6 by means of a transverse shaft 9. A prime mover 10, for example, the sixty horsepower gasoline engine used on the saws described above, is mounted on the frame 4 but reversed 180° in direction and displaced forwardly from the position on the frame 4 for use as a concrete saw. The prime mover 10 is secured on a suitable platform 11 secured to the frame 4 and the noted reversal causes the output shaft 12 of the prime mover to be directed to the right-hand side 13. The prime mover 10 is displaced forwardly on the frame 4 so as to provide the additional weight needed to produce sufficient weight-per-blade against the surface 3. A hydraulic-mechanical drive 14 which may be identical to the drive described in our copending patent application No. 655,618 is connected to a sprocket 15 on the drive shaft 9 for rotating the rear wheels 7 and 8 whereby the apparatus 1 is driven forwardly at a desired speed.

The frame forward end 5 has forwardly projecting, laterally spaced-apart, parallel, rigid structural members 16 and 17 secured thereto. The members 16 and 17 respectively support laterally spaced-apart shaft bearings 18 and 19 through mounting brackets 20 and 21. The bearings 18 and 19 have outer races 22 engaging the mounting brackets 20 and 21 and inner races 23 aligned coaxially transversely of the frame 4. The mounting brackets 20 and 21 are respectively secured in depending relation beneath the structural members 16 and 17 by means of bolts 24 extending through horizontal legs 25 and 26 of the structural members 16 and 17. The leg 26 has transversely directed elongated slots 27 receiving the bolts 24 whereby, upon loosening the respective bolts, the mounting bracket 21 is able to slide transversely of the frame 4 for adjusting the distance between the bearings 18 and 19.

3,464,737
ROAD GROOVING APPARATUS

Victor H. Haase and John R. Harclerode, Kansas City, Mo., assignors to Robert G. Evans Company, Kansas City, Mo., a corporation of Missouri
Filed Sept. 11, 1967, Ser. No. 666,761
Int. Cl. E01c 19/00; E02f 3/76; E21c 47/00
U.S. Cl. 299—39                     6 Claims

ABSTRACT OF THE DISCLOSURE

Apparatus for cutting multiple shallow grooves in the surface of pavement or the like includes parallel rotary cutting blades mounted on a shaft and spaced apart with spacer collars having axially directed drive pins extending into the blades, the blades and collars being positioned between forwardly projecting structural members on a rigid frame, the blades being supported above the ground for groove cutting by four wheels with a pivotal connection between pairs of wheels, reducing the effects of abrupt surface variations. A header pipe with spaced nozzles directs cooling fluid between the blades and a reversing pulley system permits easy conversion from a standard concrete saw. A reversible guide member projecting forwardly of the apparatus permits accurate alignment and cutting of grooves from either direction.

---

This invention relates to pavement cutting apparatus and more particularly to such apparatus adapted to simultaneously cut multiple shallow grooves in the surface of pavement or the like.

Apparatus called "concrete saws" are known for cutting relatively deep single grooves in pavement. Also known are apparatus for grinding down bumps on pavement to produce a uniformly flat surface. Such saws or bump cutters are generally unsatisfactory for cutting multiple shallow grooves for several reasons which may include slow production, insufficient weight on individual cutting blades, excessive apparatus length, poor maneuverability, blade mounting difficulties, and excessive expense.

The above disadvantages are overcome in accordance with the present invention which has for its principal objects to provide grooving apparatus for cutting multiple shallow grooves in pavement which is: relatively simple in construction, easily maneuverable and efficient in use, relatively inexpensive to build by conversion from a standard concrete saw, and incorporates a superior blade holding arrangement, guiding structure, power transmission system and blade cooling means.

Other objects and advantages of this invention will become apparent from the following description taken in connection with the accompanying drawings wherein are set forth by way of illustration and example certain embodiments of this invention.

FIG. 1 is a side elevational view showing apparatus embodying this invention with portions broken away to illustrate details of construction.

FIG. 2 is a plan view of the apparatus with the prime mover and power transmission structure removed.

FIG. 3 is a fragmentary perspective view showing a power transmission train from the prime mover to the rear wheel hydraulic drive.

FIG. 4 is a fragmentary side elevation on an enlarged

A shaft 28 extends through the inner races 23 of the bearings 18 and 19 and has stub portions 29 and 30 projecting axially outwardly beyond the bearings 18 and 19. An outer keyway groove 31 extends along the shaft 28 and a collar 32 is fixed to the shaft 28 between the bearings 18 and 19 but adjacent the bearing 18. The collar 32 has a planar face 33 directed toward the bearing 19 and a transverse bore 34 extending into the face 33 and spaced radially from the axis of the collar.

A plurality of parallel faced annular spacers 35 are slidably received on the shaft 28 and each has a pair of opposed transverse bores 36 and 37 therethrough equally radially spaced from the shaft axis on a radius equal to the collar face bore 34. An interior keyway groove 38 extends along the bore of each of the spacers 35. The spacers 35 also have multiple diameter radial bores 39 (FIG. 7) opening into the respective keyway grooves 38 from the spacer periphery 40.

Diamond impregnated blades 41, for example, 12 inches in diameter and ⁹⁄₆₄ inch thick, are slidably received on the shaft 28 between each of the spacers 35 and between the face 33 of the collar 32 and the adjacent spacer. The grooving blades 41 are of substantially greater outside diameter than the spacers and each has a bore 42 extending therethrough which is on a radius equal to that of the transverse spacer bores 36 and 37. The blade bore 42 on each adjacent blade is aligned with an oppositely positioned spacer bore 36–37, as best illustrated in FIG. 5, for balance. Drive pins 43 have a length not less than the thickness of a spacer 35 plus the thickness of blade 41 and not greater than the thickness two spacers 35 plus a blade 41, one of the drive pins 43 being received through each of the blade bores 42 and projecting into an adjacent spacer bore 36 or 37. One of the drive pins 43 is received into the collar face bore 34 and projects into the bore of the adjacent grooving blade.

A shaft key 44 is supplied for each of the spacers 35 and is engaged between the shaft keyway groove 31 and the respective spacer keyway groove 38. The keys 44 each have a threaded bore 45 extending thereinto and receiving an anchor screw 46 extending through the spacer radial bores 39, FIG. 7.

A second collar 47 is slidably received on the shaft 28 between the bearings 18 and 19 but adjacent the bearing 19. The collar 47 has a planar face 48 directed toward the bearing 18 and engaging the face of an adjacent grooving blade 41. The collar 47 has a transverse face bore 49 therein corresponding to the face bore 34 on the opposing collar 32. The bore 49 receives a drive pin 43 therein from which it projects into the bore of the adjacent blade 41 and then into the adjacent spacer 35. A keyway groove 50 is formed in the bore of the collar 47 and receives a suitable shaft key also engaging the shaft keyway 31.

A sleeve 51 is slidably received over the shaft 28 and engages the collar 47 at one end thereof and the inner race 23 of the shaft bearing 19 at the other end. A second sleeve 52 is slidable over the shaft stub portion 30 and engages the inner race 23 on the side opposite the first sleeve 51. The shaft stub portion 30 is threaded at the free end thereof and receives a shaft nut 53 thereon which engages the sleeve 52, thereby urging the collar 47 toward the collar 32 as the nut 53 is rotated with respect to the shaft 28. This causes the respective grooving blades 41 to be tightly held radially and axially in accurate spaced-apart parallel relation on the shaft 28. While the nut 53 is being tightened, the bolts 24 on the mounting bracket 21 are maintained in a loose condition whereby the mounting bracket 21 may move longitudinally along the shaft 28 and transversely of the structural member 17 (along the slots 27) to avoid binding or misalignment of the shaft bearing 19. After the nut 53 is sufficiently tightened the bolts 24 are tightened whereby the blades 41 are firmly mounted for rotation on the shaft 28 between the structural members 16 and 17.

A multiple belt pulley 54 is engaged on the shaft stub portion 29 and drive belts 55 are retained thereon and extend to a multiple belt drive pulley 56 mounted on the prime mover output shaft 12 for rotating the shaft 28 counterclockwise as viewed in FIG. 1.

A header pipe 57 extends between the structural members 16 and 17 just rearwardly of the grooving blade 41 and has cooling water supplied thereto under pressure through a suitable supply pipe 58. Nozzle tubes 59 are secured to and communicate into the header pipe 57 and extend forwardly to positions adjacent and between the peripheral side surfaces of the grooving blades 41. Lateral nozzle openings 60 are formed in the nozzle tubes at the free ends thereof for directing the cooling liquid against the blades during the grooving operation.

The multiple belt drive pulley 56 also has engaged therewith a belt 61 for transmitting motive power to the rear wheel hydraulic drive 14 through power transmitting structure 62 described below. The hydraulic drive 14 has a power input pulley 63 positioned to be driven counterclockwise as viewed in FIG. 9. The prime mover 10, however, drives the grooving blades 41 counterclockwise through the pulley 56 which is positioned on the opposite side of the frame from the pulley 63. The blades 41, unlike single blade concrete saws, must be driven against the direction of apparatus travel to prevent climbing out of the grooves due to the large area of blade contact, hence, the reason for the prime mover reversal. The power transmitting structure 62 is adapted to produce the counterclockwise rotation of the input pulley 63, as viewed in FIG. 9 with the prime mover output pulley 56 reversed in position, by means of multiple pulleys and a shaft extending transversely of the frame 4. More specifically, brackets 64 and 65 are mounted on opposite sides of the frame 4 in transversely aligned relation. The brackets 64 and 65 respectively have upwardly directed arms 66 and 67, forwardly directed arms 68 and 69 and rearwardly directed arms 70 and 71. The arms on each bracket are mutually fixed with respect to each other and pivotally mounted in a group on pivoting members 72 for rocking movement in planes extending longitudinally of the frame. Adjusting screws 73 and 74 extend downwardly through, and are threadedly engaged with, respective forwardly and rearwardly directed arms and bear against the frame 4 to adjustably fix the respective brackets in a desired pivotal position. A strut 75 is fixed to and extends between the brackets to help maintain alignment therebetween.

A transverse shaft 76 is rotatably mounted on and extends between the upwardly directed bracket arms 66 and 67. Transverse shaft pulleys 77 and 78 are mounted at opposite ends of the shaft 76 and a direction reversing idler pulley 79 is rotatably mounted on the bracket 64 rearwardly and below the shaft pulley 77. A slack take-up pulley 80 is rotatably mounted on an arm 81 and positioned above the pulley 77. The arm 81 is pivotally mounted at the end opposite the pulley 80 to a suitable point 82 on the prime mover 10 and is urged upwardly by means of a suitable tension spring 83 secured to a convenient portion of the prime mover 10. The drive belt 61 is engaged with the respective pulleys 80, 79 and 77 so that the inner side thereof contacts the pulleys 80 and 79 but the outer side contacts the pulley 77 whereby the shaft 76 rotates the pulley 78 in a counterclockwise direction, as viewed in FIG. 9, to drive the input pulley 63 of the rear wheel hydraulic drive 14. A suitable drive belt 84 connects the pulleys 78 and 63.

The forward ends 85 of the structural members 16 and 17 have a cross bar 86 extending therebetween. Upwardly open bar receiving clamps 87 and 88 are positioned at opposite ends of the cross bar 86 and each has a thumb screw 89 threadedly engaged therewith for clamping therein. Guide structure 90 for the apparatus 1 comprises a frame 91 including a rigid cross member 92 pivotally mounted at 93 on the cross bar 86 for rotation on an axis extending longitudinally of the frame 4 and transversely centrally of the blades 41. The cross member 92 has a bar projection 94 selectively receivable in the respective clamps 87 and 88 upon rotation between 180° opposed horizontal positions about the pivot point 93.

Spaced-apart parallel elongated rods 95 and 96 are hingedly mounted for transverse pivoting on the cross member 92 and project forwardly therefrom. The forward ends of the rods 95 and 96 support a transverse shaft 97 extending therebetween and on which a guide wheel 97' is rotatably mounted. When the bar projection 94 is in one of the clamps 87, 88, the guide wheel 97' rotates in a vertical plane extending longitudinally of the frame 4 and spaced outwardly from the end blade of the grooving blades 41 a distance equal to the distance between adjacent blades 41. Thus, the guide wheel 97' is positionable selectively in corresponding positions on opposite sides of the frame 4 by rotating the cross member 92 180° about the pivot point 93.

When the blades 41 are not in contact with the surface 3, the front end of the apparatus is supported by a pair of wheels 98 positioned laterally of and substantially beneath the prime mover 10. The wheels 98 are rotatably mounted on yokes 99 which are secured at opposite ends of a shaft 100 in a position offset from the common axis of the wheels 98. The shaft 100 is pivotally mounted at one end 102 to the frame 4 and at the other end to a link 103 which is pivotally secured by means of a transverse shaft 104 to the frame 4. The shaft 104 occupies what is otherwise the front wheel axle position of the concrete saw. A strut 105 is pivotally secured at opposite ends thereof to the link 103, at a position spaced from the shaft 104, and to a link 106 which is rigidly secured to, and projects radially from, the shaft 100. The linkage arrangement just described causes the yokes 99 to rotate eccentrically about the axis of the shaft 100 upon the extension and retraction of the cylinder 101. It may be seen that upon rotating the yokes 99 counterclockwise, as viewed in FIG. 1, the front of the apparatus is raised, and upon rotating the yokes clockwise as shown in FIG. 1 the front of the apparatus is lowered. By raising the front of the apparatus so the grooving blades 41 are out of contact with the ground, the apparatus may be moved to a desired location, either under its own power or by pushing, with no interference by the blades 41 with the surface 3.

For grooving, unlike concrete sawing, the blades 41 must be maintained constantly at an accurate position with respect to the surface which is being grooved. To accomplish this, blade height maintaining structure 107 is provided. The structure 107 is duplicated on each side of the apparatus and comprises a downwardly projecting lugs 108 depending from the structural members 16 and 17 rearwardly adjacent the respective bearings 18 and 19. The structure 107 has a pair of horizontally spaced-apart V-shaped support members 109 with legs 110 pivotally mounted for vertical swinging on the lug 108 and projecting forwardly and downwardly therefrom. The V-shaped support members 109 have the lower apex portions 111 located beneath the shaft 28, and legs 112 projecting forwardly and upwardly. An adjusting screw member 113 is mounted on each of the structural members 16 and 17 forwardly of the respective bearings 18 and 19 and projecting downwardly into pivotal engagement with the legs 112, whereby the apex portions 111 are adjustably movable substantially vertically beneath the blade shaft 28.

A pair of horizontally spaced-apart rocker arms 114 are located between the V-shaped support member 109 and have forward ends 115 projecting forwardly and rearward ends 116 projecting rearwardly from the apex portions 111. The rocker arms 114 are pivotally mounted at 117 between the rocker arm ends 115 and 116 to a connecting area defined by the apex portions and wheels 118 and 119 are rotatably mounted between the forward and rear ends 115 and 116 for supporting the structural members 16 and 17, and thereby the blades 41, a predetermined distance above the surface 3. In this manner four wheels cooperate to support the blades and the raising or lowering caused by a small bump or depression is minimized for height needed to hold the grooves within a close depth tolerance. A hood 120 normally covers the exposed parts of the blades 41 to reduce fluid slinging.

In operation, the apparatus is moved to a desired location with the blades 41 lifted to a safe distance above the ground by means of the wheels 98. The depth of cut is set by means of the adjusting screw members 113 and the blades are lowered to the ground by permitting the cylinder 101 to slowly retract until the wheels 98 support no load. Sufficient cooling water is supplied through the header pipe 57 to keep the blades at a safe cutting temperature, for example, two gallons per minute per blade. The apparatus is driven forwardly through the power transmitting structure between the prime mover and the rear wheels 7 and 8 as the grooves are cut into the surface 3. At the end of a cutting path, the blades are lifted by the wheels 98 and the machine is turned by manually slightly lifting the rear end and supporting the apparatus upon the independently free wheels 98. By rotating the guide structure 90, guide wheel 97' is placed in or over the last cut groove and the next grooves are cut as the apparatus travels in the reverse direction.

What we claim and desire to secure by Letters Patent is:

1. Apparatus for simultaneously cutting multiple spaced-apart shallow grooves in the surface of pavement or the like comprising:

(a) a frame having a forward end and a rear end, supporting wheels rotatably mounted on said frame, a prime mover mounted on said frame, power transmitting means connected between said prime mover and said supporting wheels for driving said frame along said surface, (b) a plurality of rotary grooving blades, means mounting said blades on said frame in coaxially spaced-apart relation for rotation in parallel vertical planes extending longitudinally of said frame, and (c) means connecting said prime mover to said blade mounting means for rotating said blades as said frame is driven forwardly along said surface, (d) said blade mounting means including first and second spaced-apart shaft bearings, a shaft engaging in said bearings and extending therebetween, a first collar fixed to said shaft between said bearings and adjacent said first bearing and having a planar face directed toward said second bearing, said first collar face having a transverse bore therein spaced from the axis thereof, (e) a plurality of annular spacers slidably received on said shaft and each having a pair of opposed transverse bores therethrough equally radially spaced from the axis thereof on a radius equal to said first collar face bore, (f) one of said grooving blades being slidably received on said shaft between said first collar and one of said spacers and between each of said spacers, said grooving blades being of greater outside diameter than said spacers and each having a transverse bore on a radius equal to that of said spacer transverse bores, each adjacent blade bore being aligned with an oppositely positioned spacer bore, (g) a plurality of drive pins having a length not less than the thickness of a spacer plus one of said blades and not greater than the thickness of two spacers plus one of said blades, one of said drive pins being received through each of said blade bores and projecting into an adjacent spacer bore, one of said drive pins being received in said first collar face bore and projecting into the bore of the adjacent blade, (h) a second collar slidably received on said shaft between said bearings and adjacent said second bearing, said second collar having a planar face directed toward said one bearing and engaging a grooving blade, said second collar having a transverse face bore therein corresponding to said first collar face bore and receiving one of said drive pins, said last named drive pin projecting into the bore of an adjacent blade, and (i) means rotatably fixing said collars and spacers with respect to said shaft.

2. Apparatus for simultaneously cutting multiple spaced-apart shallow grooves in the surface of pavement or the like comprising:

(a) a frame having a forward end and a rear end, supporting wheels rotatably mounted on said frame, a prime mover mounted on said frame, power transmitting means connected between said prime mover and said supporting wheels for driving said frame along said surface, (b) a plurality of rotary grooving blades, means mounting said blades on said frame in coaxially spaced-apart relation for rotation in parallel vertical planes extending longitudinally of said frame, (c) means connecting said prime mover to said blade mounting means for rotating said blades as said frame is driven forwardly along said surface, (d) said blade mounting means including first and second spaced-apart bearings, (e) a shaft engaged in said bearings and extending therebetween and having a stub portion projecting outwardly beyond said second bearing, a first collar fixed to said shaft between said bearings, a plurality of annular spacers slidably received on said shaft, (f) one of said grooving blades being slidably received on said shaft between said first collar and one of said spacers and between each of said spacers, said grooving blades being of greater outside diameter than said spacers, and (g) a second collar slidably received on said shaft between said bearings and engaging a grooving blade, a first sleeve slidable over said shaft and engaging said second collar and said second bearing, and a second sleeve slidable over said stub portion and engaging said second bearing on the side opposite said first sleeve engagement, (h) said stub portion being threaded and receiving a shaft nut thereon in engagement with said second sleeve and urging said first and second collars toward each other on said shaft.

3. Apparatus for simultaneously cutting multiple spaced-apart shallow grooves in the surface of pavement or the like comprising:

(a) a frame having a forward end and a rear end, supporting wheels rotatably mounted on said frame, a prime mover mounted on said frame, power transmitting means connected between said prime mover and said supporting wheels for driving said frame along said surface, (b) a plurality of rotary grooving blades, means mounting said blades on said frame in coaxially spaced-apart relation for rotation in parallel vertical planes extending longitudinally of said frame, (c) means connecting said prime mover to said blade mounting means for rotating said blades as said frame is driven forwardly along said surface, (d) an output pulley on said prime mover and located on one side of said frame, (e) first and second brackets mounted on opposite sides of said frame in transversely aligned relation, a transverse shaft rotatably mounted on and extending between said brackets, a shaft pulley mounted on one end of said last named shaft, (f) a direction reversing idler pulley rotatably mounted on said first bracket, a drive belt having an inner side and an outer side, said drive belt inner side engaging said prime mover pulley and said direction reversing pulley, said drive belt outer side engaging said transverse shaft pulley whereby said latter pulley is driven in a direction opposite to said prime mover pulley, (g) transmission structure operably engaged with said support wheels and means operably engaging the other end of said transverse shaft with said transmission structure.

4. Apparatus for simultaneously cutting multiple spaced-apart shallow grooves in the surface of pavement or the like comprising:

(a) a frame having a forward end and a rear end, supporting wheels rotatably mounted on said frame, a prime mover mounted on said frame, power transmitting means connected between said prime mover and said supporting wheels for driving said frame along said surface, (b) a plurality of rotary grooving blades, means mounting said blades on said frame in coaxially spaced-apart relation for rotation in parallel vertical planes extending longitudinally of said frame, (c) means connecting said prime mover to said blade mounting means for rotating said blades as said frame is driven forwardly along said surface, (d) an elongated framework mounted on said frame for rotation 180° on an axis extending longitudinally of said frame and transversely centrally of said grooving blades, (e) said framework projecting forwardly of said frame and having a guide wheel rotatably mounted thereon forwardly of said frame for rotation in vertical planes extending longitudinally of said apparatus and spaced outwardly of either end blade a distance equal to the distance between adjacent blades, (f) whereby said guide wheel is selectively positionable adjacent a previously cut groove as a guide regardless of the direction of travel of the apparatus.

5. Apparatus for simultaneously cutting multiple spaced-apart shallow grooves in the surface of pavement or the like comprising:

(a) a frame having a forward end and a rear end, supporting wheels rotatably mounted on said frame, a prime mover mounted on said frame, power transmitting means connected between said prime mover and said supporting wheels for driving said frame along said surface, (b) a plurality of rotary grooving blades, means mounting said blades on said frame in coaxially spaced-apart relation for rotation in parallel vertical planes extending longitudinally of said frame, (c) means connecting said prime mover to said blade mounting means for rotating said blades as said frame is driven forwardly along said surface, (d) said means mounting said blades including spaced-apart structural members and a transverse blade shaft extending between said structural members and rotatably mounted thereon, (e) legs mounted on said respective structural members and extending beneath said blade shaft, said legs each having a connecting area located beneath said shaft, (f) rocker arms having forward ends projecting forwardly and rear ends projecting rearwardly from said respective connecting areas, said rocker arms being pivotally mounted on said connecting areas between said rocker arm rear and forward ends for rocking movement in vertical planes extending longitudinally of said apparatus, and (g) ground contacting wheels rotatably mounted on said rocker arm forward and rear ends, whereby the effect of abrupt surface variations on blade cutting depth is normally reduced.

6. The method of converting a concrete saw to road grooving apparatus, said saw including a frame having a forward and a rear end, a prime mover on said frame between said frame ends and driving a saw blade mounted at said frame front end in a forward direction, the method including the steps of:
 (a) rotating said prime mover 180° on a vertical axis and moving said prime mover forwardly on said frame,
 (b) securing forwardly projecting, spaced-apart structural members on said frame,
 (c) rotatably mounting a multiple grooving blade receiving shaft on and between said structural members forwardly of said forward end, and
 (d) connecting said shaft to said prime mover for rotation in a reverse direction.

References Cited

UNITED STATES PATENTS

| | | | |
|---|---|---|---|
| 2,244,742 | 6/1941 | Tyson | 299—39 X |
| 2,736,544 | 2/1956 | Wright | 299—39 |
| 2,990,660 | 7/1961 | Hatcher | 299—39 |
| 3,141,702 | 7/1964 | Barton | 299—39 |

ERNEST R. PURSER, Primary Examiner

U.S. Cl. X.R.

299—39